US011669365B1

(12) United States Patent
Aithal et al.

(10) Patent No.: US 11,669,365 B1
(45) Date of Patent: Jun. 6, 2023

(54) TASK POOL FOR MANAGED COMPUTE INSTANCES

(71) Applicant: Amazon Technologies, Inc., Seattle, WA (US)

(72) Inventors: Anirudh Balachandra Aithal, Seattle, WA (US); Onur Filiz, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 545 days.

(21) Appl. No.: 16/551,555

(22) Filed: Aug. 26, 2019

(51) Int. Cl.
*G06F 9/48* (2006.01)
*G06F 11/14* (2006.01)
*G06F 9/50* (2006.01)

(52) U.S. Cl.
CPC .......... *G06F 9/4881* (2013.01); *G06F 9/5027* (2013.01); *G06F 11/1448* (2013.01); *G06F 2201/84* (2013.01)

(58) Field of Classification Search
CPC .. G06F 9/4881; G06F 9/5027; G06F 11/1448; G06F 2201/84
See application file for complete search history.

(56) References Cited

U.S. PATENT DOCUMENTS

| 5,727,211 | A  | 3/1998  | Gulsen |
| 7,805,706 | B1 | 9/2010  | Ly et al. |
| 7,814,491 | B1 | 10/2010 | Chen et al. |
| 8,141,075 | B1 | 3/2012  | Chawla et al. |
| 8,156,502 | B1 | 4/2012  | Blanding |
| 8,219,987 | B1 | 7/2012  | Vlaovic et al. |
| 8,417,847 | B2 | 4/2013  | McNutt et al. |
| 8,484,353 | B1 | 7/2013  | Johnson et al. |

(Continued)

FOREIGN PATENT DOCUMENTS

| EP | 2381363 A2 | 10/2011 |
| EP | 2746936 A1 | 6/2014 |

(Continued)

OTHER PUBLICATIONS

Australian Examination Report No. 1 for Standard Patent Applicaiton dated Apr. 14, 2018, Patent Application No. 2015346530, filed Nov. 10, 2015, 3 pages.

(Continued)

*Primary Examiner* — Benjamin C Wu
(74) *Attorney, Agent, or Firm* — Davis Wright Tremaine LLP

(57) ABSTRACT

A task pool may be created and maintained, in association with a container management service, which stores a snapshot of a one or more tasks, the performance of which is suspended or paused. Tasks may be defined as applications executable in one or more software containers instantiated on a virtual machine or compute instance, where the snapshot of a task may include an image of the one or more containers associated with the task container and state information of the one or more containers. A task may be initially provisioned in a paused state or paused after executing at least a portion of the task. Paused tasks in the task pool may be readily restarted or resumed by loading the snapshot onto a compute instance. The task pool may manage provisioning new tasks and pause tasks based on changes in demand.

20 Claims, 9 Drawing Sheets

(56) References Cited

U.S. PATENT DOCUMENTS

| | | | |
|---|---|---|---|
| 8,621,069 | B1 | 12/2013 | Tompkins |
| 8,732,182 | B2 | 5/2014 | Bethlehem et al. |
| 8,788,855 | B2 | 7/2014 | Cong et al. |
| 9,256,467 | B1 | 2/2016 | Singh et al. |
| 9,280,386 | B1* | 3/2016 | Hagmann .............. G06F 9/5038 |
| 9,841,988 | B1 | 12/2017 | Magnezi et al. |
| 9,929,931 | B2 | 3/2018 | Breitgand et al. |
| 9,996,380 | B2 | 6/2018 | Singh et al. |
| 10,275,270 | B2 | 4/2019 | Singh et al. |
| 10,609,122 | B1 | 3/2020 | Argenti et al. |
| 10,838,756 | B2 | 11/2020 | Singh et al. |
| 10,871,995 | B2 | 12/2020 | Gerdesmeier et al. |
| 10,931,741 | B1 | 2/2021 | Liguori et al. |
| 2004/0040025 | A1 | 2/2004 | Lehtinen |
| 2004/0123296 | A1 | 6/2004 | Challenger et al. |
| 2006/0136928 | A1 | 6/2006 | Crawford et al. |
| 2006/0168575 | A1 | 7/2006 | Bhatt et al. |
| 2006/0168581 | A1 | 7/2006 | Goger et al. |
| 2007/0118657 | A1 | 5/2007 | Kreitzer et al. |
| 2007/0233698 | A1 | 10/2007 | Sundar et al. |
| 2007/0245331 | A1 | 10/2007 | Daynes et al. |
| 2008/0235361 | A1 | 9/2008 | Crosbie et al. |
| 2008/0244611 | A1 | 10/2008 | Doyle et al. |
| 2009/0293056 | A1 | 11/2009 | Ferris |
| 2010/0070978 | A1 | 3/2010 | Chawla et al. |
| 2010/0153941 | A1 | 6/2010 | Borissov et al. |
| 2012/0042079 | A1 | 2/2012 | Ackerman et al. |
| 2012/0233331 | A1 | 9/2012 | Voccio et al. |
| 2012/0233668 | A1 | 9/2012 | Leafe et al. |
| 2013/0097601 | A1 | 4/2013 | Podvratnik et al. |
| 2013/0124807 | A1 | 5/2013 | Nielsen et al. |
| 2013/0191527 | A1 | 7/2013 | Ashok et al. |
| 2013/0227091 | A1 | 8/2013 | Tompkins |
| 2013/0227563 | A1 | 8/2013 | McGrath |
| 2013/0247034 | A1 | 9/2013 | Messerli |
| 2013/0297964 | A1 | 11/2013 | Hegdal et al. |
| 2014/0130038 | A1 | 5/2014 | Lucovsky et al. |
| 2014/0149986 | A1 | 5/2014 | S M et al. |
| 2014/0173618 | A1 | 6/2014 | Neuman et al. |
| 2014/0196039 | A1 | 7/2014 | Kottomtharayil et al. |
| 2014/0366018 | A1 | 12/2014 | Spradlin et al. |
| 2015/0106520 | A1 | 4/2015 | Breitgand et al. |
| 2015/0120928 | A1 | 4/2015 | Gummaraju et al. |
| 2015/0277952 | A1 | 10/2015 | Lin et al. |
| 2015/0378765 | A1 | 12/2015 | Singh et al. |
| 2016/0055016 | A1 | 2/2016 | Beveridge |
| 2016/0087992 | A1 | 3/2016 | Ringdahl et al. |
| 2016/0098285 | A1 | 4/2016 | Davis et al. |
| 2016/0378519 | A1 | 12/2016 | Gaurav et al. |
| 2017/0063722 | A1 | 3/2017 | Cropper et al. |
| 2017/0180346 | A1 | 6/2017 | Suarez et al. |
| 2017/0264684 | A1 | 9/2017 | Spillane et al. |
| 2017/0351538 | A1 | 12/2017 | Beveridge et al. |
| 2017/0371568 | A1 | 12/2017 | Aravot et al. |
| 2017/0371703 | A1* | 12/2017 | Wagner ................... G06F 9/485 |
| 2017/0371706 | A1* | 12/2017 | Wagner ................... G06F 9/485 |
| 2018/0060740 | A1 | 3/2018 | Bradley et al. |
| 2018/0088993 | A1* | 3/2018 | Gerdesmeier ......... G06F 9/5077 |
| 2018/0173502 | A1 | 6/2018 | Biskup et al. |
| 2019/0391834 | A1* | 12/2019 | Mullen ................ G06F 9/5005 |
| 2019/0391841 | A1* | 12/2019 | Mullen ................... G06F 9/485 |
| 2020/0301726 | A1 | 9/2020 | Singh et al. |

FOREIGN PATENT DOCUMENTS

| | | | |
|---|---|---|---|
| JP | 2001134453 | A | 5/2001 |
| JP | 2013543171 | A | 11/2013 |
| JP | 2014514659 | A | 6/2014 |
| JP | 2016541183 | A | 12/2016 |
| JP | 2017534107 | A | 11/2017 |
| JP | 2017534967 | A | 11/2017 |
| JP | 2017538204 | A | 12/2017 |
| KR | 20130115553 | A | 10/2013 |
| KR | 20140086436 | A | 7/2014 |
| KR | 20170097071 | A | 8/2017 |
| RU | 2250490 | C2 | 4/2005 |
| RU | 2374675 | C2 | 11/2009 |
| RU | 2481618 | C2 | 5/2013 |
| RU | 2502125 | C2 | 12/2013 |
| WO | 2014047073 | A1 | 3/2014 |
| WO | 2014124448 | A1 | 8/2014 |
| WO | 2016077367 | A1 | 5/2016 |
| WO | 2016090292 | A1 | 6/2016 |
| WO | 2016126731 | A1 | 8/2016 |

OTHER PUBLICATIONS

Australian Examination Report No. 1 for Standard Patent Application dated May 5, 2020, Patent Application No. 2019204805, 6 pages.
Australian Examination Report No. 1 dated Sep. 27, 2019, Patent Application No. 2017337061, filed Sep. 29, 2017, 5 pages.
Australian Notice of Acceptance for Patent Application dated Mar. 25, 2019, Patent Application No. 2015346530, filed Nov. 10, 2015, 3 pages.
Australian Notice of Acceptance dated Feb. 27, 2020, Patent Application No. 2017337061, filed Sep. 29, 2017, 3 pages.
Benedicic et al., "Opportunities for container environments on Cray XC30 with GPU devices," Cray Users Group Conference (CUG16), Apr. 8, 2016, 11 pages.
Bernstein, "Containers and Cloud: From LXC to Docker to Kubernetes," IEFF Cloud Computing, 1(3):81-84, Sep. 2014.
Buyya et al., "Cloud computing and emerging IT platforms: Vision, hype, and reality for delivering computing as the 5th utility," Future Generation Computer Systems 25(6):599-616, Jun. 1, 2009.
Calheiros et al., "The Aneka platform and QoS-driven resource provisioning for elastic applications on hybrid Clouds," Future Generation Computer Systems 28(6):861-870, Jun. 1, 2012.
Chase et al., "Dynamic Virtual Clusters in a Grid Site Manager," Proceedings of the 12th IEEE International Symposium on High Performance Distributed Computing (HPDC'03), Jun. 22, 2003, 11 pages.
Chinese Decision on Rejection dated Dec. 2, 2020, Patent Application No. 201580061134.7, 17 pages.
Chinese First Office Action dated Feburary 3, 2020, Patent Application No. 201580061134.7, filed Nov. 10, 2015, 16 pages.
Chinese Second Office Action dated Aug. 4, 2020, Patent Application No. 201580061134.7, 15 pages.
Dua et al., "Virtualization vs Containerization to support PaaS," Proceedings of International Conference on Cloud Engineering 2014, Mar. 11, 2014, 6 pages.
European Communication pursuant to Article 94(3) EPC dated Sep. 9, 2018, Patent Application No. 15804248.1, filed Nov. 10, 2015, 4 pages.
European Summons to attend oral proceedings pursuant to Rule 115(1) EPC mailed Jan. 27, 2020, Paatent Application No. 15804248.1, 15 pages.
Fifield et al., "OpenStack Operations Guide," O'Reilly, May 2014, 329 pages.
He et al., "Elastic Application Container: A Lightweight Approach for Cloud Resource Provisioning," 26th IEEE International Conference on Advanced Information Networking and Applications, Mar. 26, 2012, pp. 15-22.
Hong et al., "Container-Based Job Management for Fair Resource Sharing," Proceedings of International Supercomputing Conference, Jun. 16, 2013, 12 pages.
Huber et al., "Model-based self-adaptive resource allocation in virtualized environments." Proceedings of the 6th International Symposium on Software Engineering for Adaptive and Self-Managing Systems, May 23, 2011, 10 pages.
Hámori, "The History of Kubernetes on a Timeline," RisingStack, Jun. 20, 2018 (retrieved Oct. 23, 2020), https://blog.risingstack.com/the-history-of-kubernetes/, 14 pages.
International Search Report and Written Opinion dated Feb. 4, 2016, International Patent Application No. PCT/US2015/059983, 12 pages.
International Search Report and Written Opinion dated Jan. 3, 2018, International Patent Application No. PCT/US2017/054489, filed Sep. 29, 2017, 15 pages.

(56) References Cited

OTHER PUBLICATIONS

Ismail et al., "Evaluation of Docker as Edge Computing Platform," 2015 IEEE Conference on Open Systems (ICOS), Aug. 26, 2015, 6 pages.
Iwao, "It is light! Automation of the virtual image creation without the 'Docker' overhead which realizes new virtualization—the optimum," Nikkei Systems, Nikkei BP, Jul. 26, 2014, No. 256, and pp. 62-67.
Japanese Decision to Grant a Patent dated Apr. 1, 2019, Patent Application No. 2017-524393, filed Nov. 10, 2015, 3 pages.
Japanese Decision to Grant a Patent dated Feb. 24, 2021, Patent Application No. 2019-082701, 4 pages.
Japanese First Office Action dated Jun. 22, 2020, Patent Application No. 2019-082701, 18 pages.
Japanese Notice of Reasons for Refusal dated Mar. 10, 2020, Patent Application No. 2019-516173, filed Sep. 29, 2017, 3 pages.
Japanese Notice of Reasons for Rejection dated Nov. 24, 2020, Patent Application No. 2019-516173, 2 pages.
Japanese Office Action dated Jul. 9, 2018, Patent Application No. 2017-524393, filed Nov. 10, 2015, 6 pages.
Jellema, "Vagrant and Docker—Next and Advanced steps with folders, ports, volumes, linking and more," AMIS Technology Blog, https://technology.amis.nl/2015/08/25/vagrant-and-docker-next-and-advanced-steps-with-folders-ports-volumes-li n ki ng-and-mor, Aug. 25, 2015 [retrieved Jun. 14, 2019], 13 pages.
Korean Decision of Patent Grant dated Aug. 8, 2019, Patent Application No. 10-2019-7005048, filed Nov. 10, 2015, 3 pages.
Korean Decision on Grant dated Nov. 20, 2018, Application No. 10-2017-7015815, filed Nov. 10, 2015, 3 pages.
Korean Notice of Preliminary Rejection dated Mar. 8, 2019, Patent Application No. 10-2019-7005048, filed Nov. 10, 2015, 3 pages.
Korean Notice of Preliminary Rejection dated May 28, 2018, Patent Application No. 10-2017-7015815, filed Nov. 10, 2015, 4 pages.
Lama et al., "Aroma: Automated resource allocation and configuration of mapreduce environment in the cloud," Proceedings of the 9th International Conference on Autonomic Computing, Sep. 18, 2012, 10 pages.
Lloyd et al., "Dynamic Scaling for Service Oriented Applications: Implications of Virtual Machine Placement on IaaS Clouds," IEEE International Conference on Cloud Engineering, Mar. 11, 2014, 6 pages.
Mori, "A guide to 'Docker' of a next-generation virtual environment construction software open source," The Nikkei Software, Nikkei BP, Apr. 24, 2014, the 17th volume, No. 10, the 204th volume of the set, pp. 84-87.
Mori, "It is construction about the lightweight OS environment for Docker containers", Nikkei Linux, Nikkei BP, Sep. 8, 2014, the 16th volume, No. 10, the 181st volume of the set, p. 50.
Müller et al., "An Elasticity-aware Governance Platform for Cloud Service Delivery," 2016 IEEE International Conference on Services Computing (SCC), Jun. 27, 2016, 8 pages.
Paraiso et al., "Model-driven management of docker containers," 2016 IEEE 9th International Conference on Cloud Computing (Cloud), Jun. 2, 2016, 9 pages.
Pikkarainen et al., "The impact of agile practices on communication in software development," Empirical Software Engineering 13(3):303-37, Jun. 1, 2008.
Ramamritham, "Allocation and scheduling of precedence-related periodic tasks," IEEE Transactions on Parallel and Distributed Systems 6(4):412-420, Apr. 1995.
Russian Decision on Grant a Patent for Invention dated Aug. 8, 2019, Patent Application No. 2018130629, filed Nov. 10, 2015, 13 pages.
Russian Decision on Grant a Patent for Invention dated Jun. 26, 2018, Patent Application No. 2017116433, filed Nov. 10, 2015, 13 pages.
Russian Office Action dated Apr. 15, 2020, Patent Application No. 2019131233, 7 pages.
Russian Office Action dated Dec. 21, 2020, Patent Application No. 2019131233, 6 pages.
Russian Office Action dated Jul. 22, 2020, Patent Application No. 2019131233, 9 pages.
Russian Office Action dated May 20, 2019, Patent Application No. 2018130629, filed Nov. 10, 2015, 5 pages.
Soltesz et al., "Container-based Operating System Virtualization: A Scalable, High-Performance Alternative to Hypervisors," ACM SIGOPS Operating Systems Review 41(3):275-287, Mar. 2007.
Spillane et al., "Exo-clones: Better Container Runtime Image Management across the Clouds," 8th USENIX Workshop on Hot Topics in Storage and File Systems (HotStorage 16), Jun. 21, 2016, 5 pages.
Thiele et al., "Embedded Software in Network Processors—Models and Algorithms," Lecture Notes in Computer Science 2211:416-34, Oct. 8, 2001.
Tihfon et al., "An efficient multi-task PaaS cloud infrastructure based on docker and AWS ECS for application deployment," Cluster Computing 19(3):1585-1597, Jul. 23, 2016.
Uchida, "Construction of Production Environment and Deployment of Docker Containers," Web+DB Press, vol. 86, pp. 106-113, May 25, 2014.
Van et al., "SLA-aware Virtual Resource Management for Cloud Infrastructures," IEEE Ninth International Conference on Computer and Information Technology, Oct. 11, 2009, pp. 357-362.
Wu et al., "TotalCOW: Unleash the Power of Copy-On-Write for Thin-provisioned Containers," Proceedings of the 6th Asia-Pacific Workshop on Systems, Jul. 28, 2015, 7 pages.
Xavier et al., "Performance Evaluation of Container-based Virtualization for High Performance Computing Environments," Parallel, Distributed, and Network-Based Processing (PDP), 2013 21st Euromicro International Conference, Feb. 2013, pp. 233-240.
Yamato et al., "Development of template management technology for easy deployment of virtual resources on OpenStack," Journal of Cloud Computing 3(1):7, Jun. 14, 2014, 12 pages.
Zhao et al., "Experimental Study of Virtual Machine Migration in Support of Reservation of Cluster Resources," Proceedings of the 2nd International Workshop on Virtualization Technology in Distributed Computing, Nov. 2007, pp. 1-8.

* cited by examiner

_US 11,669,365 B1_

TASK POOL FOR MANAGED COMPUTE INSTANCES

BACKGROUND

Modern computer systems are frequently implemented as distributed collections of computer systems operating collectively within one or more host computer system environments. As part of this implementation, software containers, which are lightweight, virtualized execution environments for applications are frequently used. Containers allow for easily running and managing applications across a cluster of servers or virtual machines. Applications packaged as containers can be deployed across a variety of environments, such as locally and within a compute service. Customers may specify various tasks for the compute service to perform, with a task defining one or more applications running across multiple containers. As the compute services provided become more complex, so does managing the services to effectively process customer tasks while making efficient use of resources. For example, customer tasks often span multiple containers, and require a not insignificant amount of time to initialize.

BRIEF DESCRIPTION OF THE DRAWINGS

Various techniques will be described with reference to the drawings, in which.

DETAILED DESCRIPTION

Figure 1:
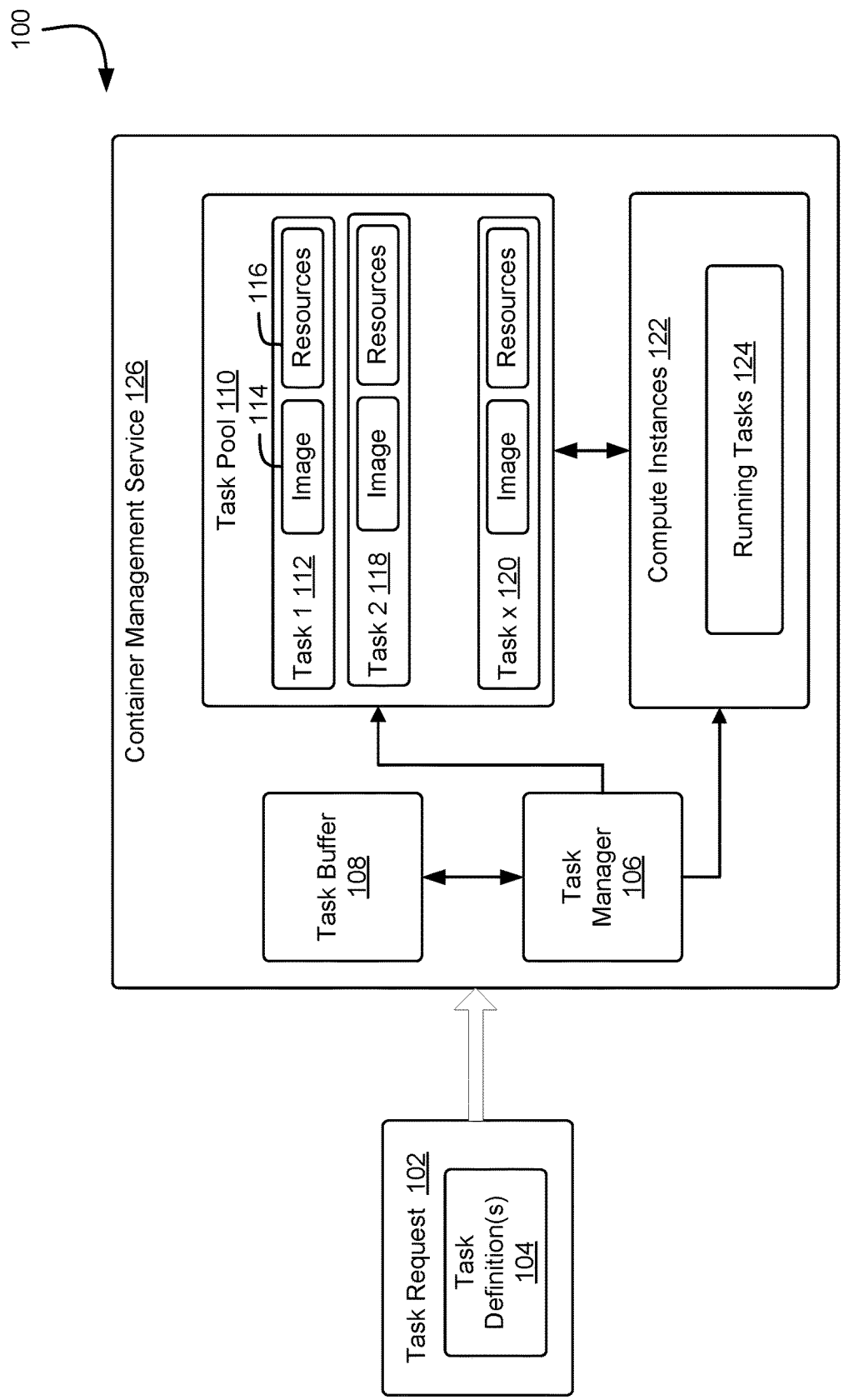
FIG. 1 illustrates an example environment where tasks may be executed and managed by container management service using a task pool.

The following disclosure describes techniques for managing tasks executable on compute instances (i.e., virtual machine instances used to host containers) using a task pool of a container management service. A customer of a computing resource services provider (e.g., a cloud provider) that provides access to computation resources and services may describe one or a number of tasks to be performed, each task using a set of software containers, via a task definition. These software containers, also referred to simply as "containers" are lightweight, virtualized execution environments for applications that wrap an application in its own complete file system that contains everything needed to the application, including the software, files, and system libraries. A container management application (e.g., a container agent) in turn allocates resources of an operating system to run the container.

In some implementations, customers of a cloud provider can deploy containers by managing clusters of compute instances that run container agents. In such implementations, customers manage scaling, monitoring, patching, and security of the compute instances, in addition to managing their containerized workload. In some implementations, customers of a cloud provider may deploy and scale containerized workloads automatically without having to manage the underlying computing resources, for example via a container management service that receives information from a customer about their workload and then automatically selects the appropriate compute resources to run the workload. Beneficially, such a "serverless container" approach abstracts away the underlying infrastructure, enabling the customer to simply focus on their containerized application, by managing clusters of compute instances on behalf of the customer. However, in such a managed container implementation, customers may not be able to create "warmpools" of compute instances that are held available in order to scale up their workload and service requests on demand with low latencies.

Embodiments of the present disclosure address the aforementioned challenges, among others, by maintaining a certain number of paused instantiations of one or more tasks that can be quickly unpaused in response to changes in demand for the containerized workload. As described below, a task or an instantiation of a task refers to one or more containers cooperating together to execute a workload (e.g., an application or a portion of an application). A paused task or instantiation of a task, as described herein, refers to a snapshot of a task that has had its resources fully configured; a paused task may be resumed more quickly than the time required to launch a new task. Via the systems and techniques described herein, tasks may be paused and maintained in a task pool, and subsequently resumed, in order to more efficiently utilize resources of the computing resource service provider, while also reducing the time to execute requested tasks. As used herein, a task may generally refer to an instantiation of a task, such that multiple instantiations of the same task may be stored (e.g., as paused instantiations of a task) or executed. Similarly, tasks in the plural may refer to different instantiations of the same task or different instantiations of different tasks.

In one aspect, a task definition may be received, and one or more compute instances may be initialized, for example, by a container management service, to execute the task. One or more containers, as defined in the task definition, may be instantiated on the compute instance. Executable instructions or code, for example, provided by a customer in the task definition, or indicated in the task definition, may be loaded into the one or more containers to execute one or more programs. Resources defined by the task definition may be connected, as appropriate, to the one or more containers, via one or more network connections. A snapshot may then be taken of the task, including, an image of one or more containers of the task, and current application state information, such as resource allocations or mapping (e.g., network connections). The compute instance or instances may then be paused or deactivated, such that resources including memory and central processing units (CPUs) of the compute instances are released and no longer assigned to execute the task. The snapshot may be stored in memory, such as disk space maintained or accessible to the container management service, for future retrieval, for example in a task pool. A buffer or record may be maintained of the paused tasks in the task pool, for example, organized by customer or associated workload. The buffer may indicate a total number of paused tasks available for a workload in the task pool, and number of currently running or utilized tasks. A task manager may monitor customer workloads, paused and running tasks, facilitate launching new tasks, and facilitate resuming or unpausing tasks in the task pool, in order to more effectively and efficiently manage customer workloads.

The task may be resumed, for example in response to increased traffic hitting the customer workload utilizing the task, responsive to a direct request from the customer, etc., via the task manager. The task manager may retrieve the snapshot of the task to resume the paused task. This may include launching or allocating one or more compute instances, instantiate the container(s) for the task via the image, and configuring the container(s) according to the current application state information, such as by connecting any indicated resources in the resource mapping. Upon initialization, the task may be executed.

In some cases, a task manager managing a task pool may detect the occurrence of an event indicating a change in demand. If demand is increasing, the task manager may resume a number of paused tasks to meet the demand, and update a record of paused tasks available. If no tasks are available, new tasks may be instantiated, according to parameters associated with the task, such as defined in a task definition. If the demand is decreasing, the task manager may pause tasks in order to conserve resources, while still meeting the current demand.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including some or all of the following: (1) increasing utilization of compute resources, such as provided by a container management service or computing resource service provider, and/or (2) increase efficiency for configuring and launching computing resources, for example responsive to demand.

FIG. 1 illustrates an example environment 100 where tasks are managed using a container management service in accordance with an embodiment. In some examples, container management service 126 may include one or more aspects of the container management service described in U.S. Pat. No. 9,256,467, filed on Nov. 11, 2014, entitled "SYSTEM FOR MANAGING AND SCHEDULING CONTAINERS," the contents of which are herein incorporated by reference in its entirety. In the example illustrated in FIG. 1, a request 102 to launch one or more tasks, defined by one or multiple task definitions 104, is received at a container management service 126. Each task definition 104 is, in an embodiment, a file specifying a set of linked containers (i.e., a set of containers that, when running on a host computing system, are associated with each other) that are assigned to start as a group. The task definition 104 may specify persistent storage and network locations that the containers associated with the task are able to share on a single physical machine. The task definition 104 may then be utilized for launching the containers associated with the task. A task definition 104 may define and link containers that are distributed to multiple physical hosts. One task definition 104 may contain and schedule many tasks. In some examples, a "task" may refer to an instantiation of the resources specified by the task definition, and may include one or more containers. Tasks may be modified by applying a new task definition to the task.

A container, as referred to herein, may include code and all its dependencies such that an application (also referred to as a task) can run quickly and reliably in an isolated computing environment. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

In the context of software containers, a task refers to a container, or multiple containers working together, running to execute the functionality of a software application or a particular component of that application. In some implementations, tasks can also include virtual machines, for example virtual machines running within an instances that hosts the container(s). A task definition can enable container images to be run in a cloud provider network to execute a task. A task definition can specify parameters including which container image to use with each container in the task, interactions between containers, constraints on container placement within a cloud provider network, what quantities of different hardware resources should be allocated to the task or to specific containers, networking modes, logging configurations, persistent storage that should be used with the containers in the task, and whether the task continues to run if a container finishes or fails. Multiple containers can be grouped into the same task definition, for example linked containers that must be run together to execute related processes of an application, containers that share resources, or containers that are required to be run on the same underlying host. An entire application stack can span multiple task definitions by separating different components of the application into their own task definitions. An application can be defined using a service definition, which can specify configuration parameters that define the service including which task definition(s) to use, how many instantiations of each task to run, and how the tasks should be load balanced.

As described above, the task definition 104 specifies the information needed to instantiate containers associated with the task. The task definition specifies the information needed to instantiate containers associated with the task as, for example, a set of resource parameters (e.g., a CPU specification, a memory specification, a network specification, and/or a hardware specification) as described below. The task definition 104 may also specify the information needed to instantiate containers associated with the task as a container image (i.e., an image or snapshot of a previously instantiate container) or as an image specification (i.e., a description of an image that may be used to instantiate an image). An image specification and/or an image may be specified by the customer of the computing resource services provider, specified by the computing resource services provider, or specified by some other entity (e.g., a third-party). The task definition 104 may instantiate the containers in a cluster or group that provides isolation of the instances and/or the tasks. The containers and the isolation may be managed through application programming interface ("API") calls as described herein.

An example of a task definition may be:
{'db':
  {
    'Image':postresql',
    'CPU':1000,
    'Memory':1073741824
  },
  'cms':
  {
    'Image':'content_manager',
    'links':{'db'},
    'CPU':1000,
    'Memory':1073741824
  }
}

The example task definition specifies that a first task, entitled "db," has a software image located at the path "postgresql." The first task is allocated processing shares of one-thousand and one GB of memory by a container management service 126. Similarly, the task definition also specifies that a second task, entitled "cms," has a software image located at the path "content_manager." The second task is also allocated processing shares of one-thousand and one GB of memory by a container management service 126. The task definition notes that the second task ("cms") is allowed to link to the first task ("db"). Note that while some units used in this example are given as a fixed number, such as the processing capacity given as a fixed number of central processing unit shares, it is contemplated that other units and other types of values (e.g., percentages of total processing capacity, percentages of total memory) could be used instead to allow for dynamic resource allocation.

The container management service 126 may be a collection of computing resources that operate collectively to process task definitions to perform tasks as described herein by providing and managing tasks and compute instances where the tasks and the associated containers can be executed. The computing resources configured to process task definitions and provide and manage compute instances where the tasks and the associated containers can be executed include at least one of: computer systems (the computer systems including processors and memory), networks, storage devices, executable code, services, processes, modules, or applications. The computing resources configured to process task definitions and provide and manage compute instances where the tasks and the associated containers can be executed may include virtual systems that are implemented on shared hardware hosted by, for example, a computing resource service provider. The container management service 126 may be implemented as a single system or may be implemented as a distributed system, with a plurality of instances operating collectively to process task definitions and provide and manage compute instances where the tasks and the associated containers can be executed. The container management service 126 may operate using computing resources (e.g., other services) that enable the container management service 126 to receive task definitions, instantiate compute instances, communicate with compute instances, and/or otherwise manage compute instances.

The container management service 126 may be a service provided by a computing resource service provider to allow a customer of the computing resource service provider to execute tasks using containers on compute instances as described below. The computing resource service provider may be a computing resource service provider similar to the computing resource service provider 310, described in connection with FIG. 3, and may provide one or more computing resource services to its customers individually or as a combination of services of a distributed computer system. The one or more computing resource services of the computing resource service provider may be accessible over a network and may include services such as virtual computer system services, block-level data storage services, cryptography services, on-demand data storage services, notification services, authentication services, policy management services, task services, and/or other such services. Not all embodiments described include all of the services described and additional services may be provided in addition to, or as an alternative to, services explicitly described.

As one example, the computing resource service provider may be an entity that provides computing resources, such as data storage services, virtual computer system services, and/or web services. Customers of the computing resource service provider may communicate with one or more of the services via an interface, which may be a web services interface or any other type of customer interface. Each service provided by a computing resource service provider may have its own interface and subsets of the services may have corresponding individual interfaces in addition to, or as an alternative to, a common interface.

In some examples, a compute instance (also referred to herein as a "container instance" or "software compute instance") may refer to a computer system instance (virtual or non-virtual, such as a physical computer system running an operating system) that is configured to launch and run software containers. Thus, the compute instance may be configured to run tasks in containers in accordance with the task definition provided by the customer. One or more compute instances may comprise an isolated cluster or group of containers. In some examples, "cluster" may refer to a set of one or more compute instances that have been registered to (i.e., as being associated with) the cluster. Thus, a compute instance may be one of many different compute instances registered to the cluster, and other compute instances of the cluster may be configured to run the same or different types of containers. The compute instances within the cluster may be of different instance types or of the same instance type. A customer of a computing resource service provider may have more than one cluster. Thus, the customer may launch one or more clusters and then manage user and application isolation of the containers within each cluster through application programming interface calls.

A container (also referred to as a "software container") may be a lightweight virtual machine instance running under a computer system instance that includes programs, data, and system libraries. When the container is run (or executed), the running program (i.e., the process) is isolated from other processes running in the same computer system instance. Thus, containers may each run on an operating system (e.g., using memory, CPU, and storage allocated by the operating system) of the compute instance and execute in isolation from each other (e.g., each container may have an isolated view of the file system of the operating system). Each of the containers may have its own namespace, and applications running within the containers are isolated by only having access to resources available within the container namespace. Thus, containers may be an effective way to run one or more single applications within their own namespace. A container encapsulation system allows one or more containers to run within a single operating instance without overhead associated with starting and maintaining virtual machines for running separate user space instances.

The containers may be launched to have only specified resources from resources allocated to the compute instance; that is, a container may be launched to have a certain amount of memory and to not utilize more than a specified amount of processing power. For example, a task definition 104 may specify two CPUs, but that the container for an application cannot exceed 50% of those two CPUs. The resource allocation for the containers may be specified in the task definition 104. Multiple containers may run simultaneously on a single host computer or host compute instance, and the resources of the host can be allocated efficiently between the containers using this system. In an embodiment, a host supports running containers in compute instances from only one customer (referred to herein as a "single-tenant" environment). In other embodiments, a single host may allow multiple customers to have compute instances running on the host (referred to herein as a "multi-tenant" environment). In the latter case, the container service may provide security to ensure that the customers are unable to access containers, clusters, or compute instances of the others.

Different types of tasks may have different resource parameters and may have different lifespans. Thus, containers may be dynamically scheduled to run by a scheduler service independent of an underlying operating system of the compute instance, and as such, the underlying operating system of a compute instance may be very basic. Alternatively, containers may be scheduled to run by a scheduler installed on the compute instance.

The container management service 126 may include a task manager 106, which may provision, pause, and resume tasks in response to receiving a task request, such as task request 102. The task manager 106 may be a process running on one or more compute resources, virtual, physical or a combination thereof, of the container management service 126. In some cases, the request 102 may originate from a service, such as an autoscaling service, which as provided by a computing resource service provider. In some aspects, based on demand, historical information, or other factors, an autoscaling service may instruct task manger 106 to pause resume or start one or more new tasks.

The task manager may interface with a task pool 110, a task buffer 108, and one or more compute instances 122 to store, pause, and resume tasks managed by task pool 110. The task pool may maintain one or a number of paused or suspended tasks 112, 118, to 120. Each task 112, 118, 120 in task pool 110 may be associated with a task or container image, such as image 114, and resource map 116. The image 114 may be an image or images of one or a number of containers configured to execute the respective task, for example, captured at a time the task was running or after it was instantiated but before it was running. The resource map 116 may include any network connections, addressed, etc., of resources utilized by the container(s) of the task to perform the task.

In some aspects, the task pool 110 may store information and/or one or more uniform resource name or location (URN or URL) of one or more of a task definition, an image, and a resource mapping of a given task. In some aspects, the resource mapping may include one or more network connections used to execute the task. In other aspects, the task pool 110 may store the actual task definition, image, and/or resource mapping for one or more paused tasks.

In some cases, the task manager 106 may capture a snapshot, including the image 114 and resources 116, of a task 112, in order to pause the task. In some cases, resources, including one or more compute instances 122, one or more containers, one or more applications to run executable instructions provided in association with the request for a new task in the one or more containers, and/or one or more resource mappings, may be instantiated and then paused, such as before the task is actually performed or only partially performed. In other cases, a running task 124, executing on one or more compute instances 122 may be paused, such that the resources utilized by the compute instance(s) to execute the task may be released (e.g., to be freed up for use by other tasks or processes executed by the compute instance) or deactivated. Releasing or deactivating the compute instance(s) may result in no or less processor and/or memory of the compute instance(s) being utilized when the task is in the paused state. Releasing or deactivating the compute instance(s) for a paused task may conserve resources of the container management service 126 and increase utilization of those resources. This may in turn reduce cost for the customer to maintain these tasks at times when their workloads decrease, and quickly start them back up again when their workloads increase.

The task manager 106 may also resume paused tasks in a reverse order of operations. In some examples, upon receiving a task request 102, the task manager 106 may access task pool 110 to determine if any tasks matching the task definition 104 are currently available in the task pool 110. In some cases, the task manager 106 may access a task buffer 108, which may maintain and update a record of what paused tasks are available in the task pool 110. If a task matching the task definition 104 is available in task pool 110, the task manager 106 may instantiate the resources of the task, such as by accessing the image 114 and resources 116 of a task 112. The task manager may then facilitate loading the image and resource mapping onto one or more container instances 122, to resume performance of the paused task.

In some aspects, a customer may include in the task request 102 a first number of desired tasks to be made available if needed, for example, to handle a burst in traffic that utilizes the tasks. In some cases, the request may specify a number of similar tasks or copies of a task, such as via the task definition 104. The request may also specify a second number of tasks to be started or run currently. In this example, the container management service 126 may launch the total number of tasks, and pause any tasks that exceed the second number of tasks. In this way, tasks may be ready for efficient execution upon a burst in customer workload, while not consuming resources of the container management service 126. In some aspects, the container management service 126, may include or be hosted on web server 906 and/or application server 908, as described below in more detail in reference to FIG. 9.

Figure 2:
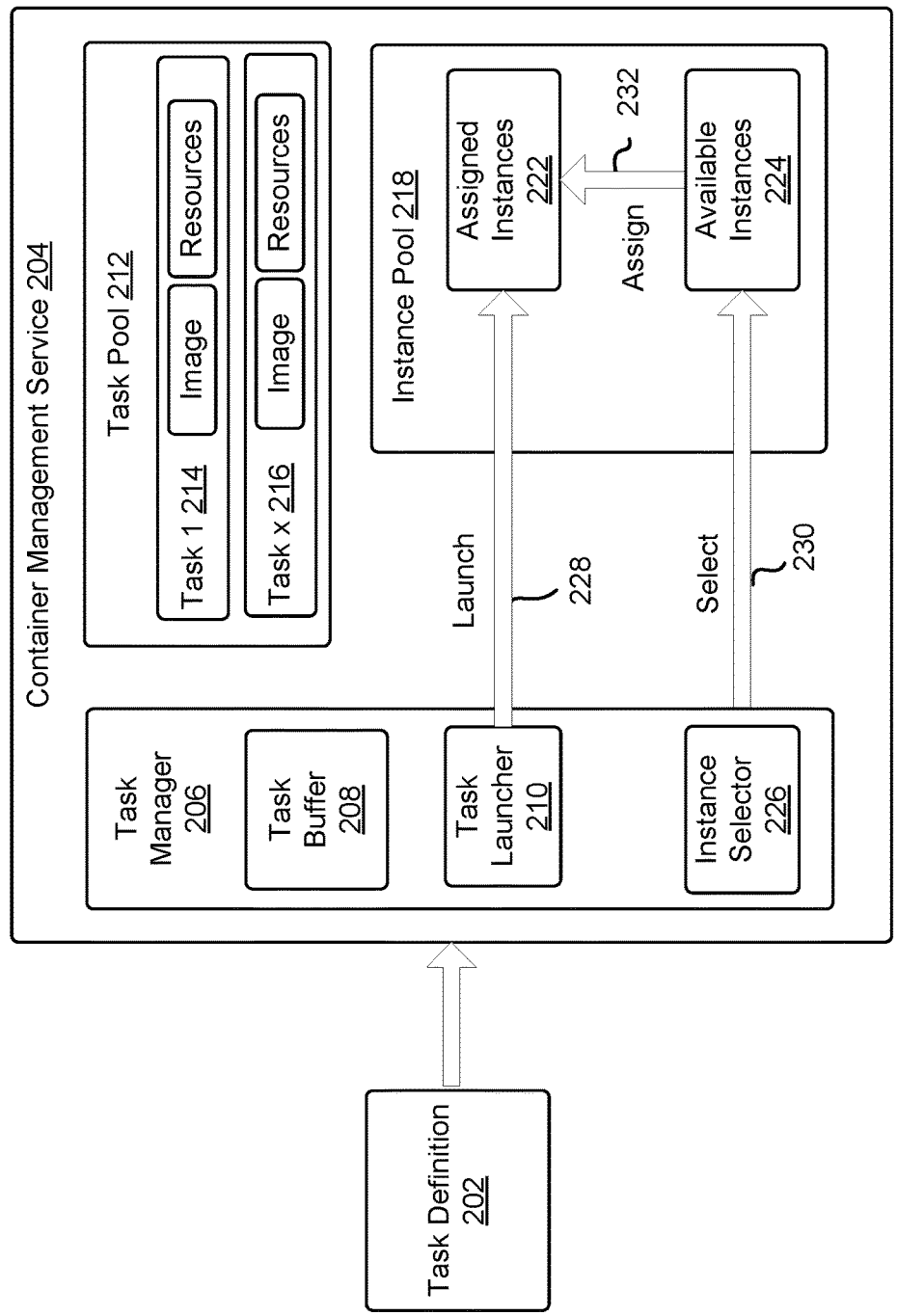
FIG. 2 illustrates a more detailed example of an environment where tasks may be executed and managed by container management service using a task pool.

FIG. 2 illustrates another example environment 200 where tasks are managed using a container management service in accordance with an embodiment. In the example illustrated in FIG. 2, a task definition 202, is received at a container management service 204. Task manager 206 of container management service 204, may access task buffer 208 and task pool 212 to determine if a paused task, such as tasks 214 and 216, is available and satisfies the task definition 202. Upon determining that a paused tasks is available, task manager 206 may direct a task launcher 210 to launch the paused task onto one or more compute instances of an instance pool 218, according to the image and resources indicated in the snapshot of the paused task. Otherwise, if a paused task is not available to execute the task defined by task definition 202, the task manger 206 may similarly direct a task launcher 210 to launch a new task according to the task definition 202.

The task launcher 210 may send a launch instruction 228 to instance pool 218, which may manage and maintain a group of running compute instances 224. An instance selector program 226 may select instances 230 from the running instances in the instance pool 218 by selecting one from a database. The instance pool 218 contains a number of running instances (also referred to herein as "running instances") which may be of multiple different instance types. The instance types are types by capabilities provided by the instance. So, for example, a first instance type may be type "A" with two CPUs, four GB of memory, and a gigabit network interface. The instance pool 218 may have tens, hundreds, or thousands of running instances of type "A" already running and available. A second instance type may be type "B" with four CPUs, eight GB of memory, and a gigabit network interface. The instance pool 218 may also have tens, hundreds, or thousands of running instances of type "B" instances already running and available.

The instance selector program 226 of the container management service 204 may select instances 230 from the available instances 224 of the instance pool 218. Available instances 224 may be instances that are available to host containers for a customer of the computing resource service provider. Available instances 224 may be instances of the specified type that have no containers running thereon, instances that have no containers from other customers running thereon (in a single-tenant environment) and that have sufficient resources available to host containers for the task, or are instances that may have containers from other customers running thereon (in a multi-tenant environment) but that have sufficient resources available to host containers for the task. As instances are assigned to a customer, the instances may be removed from the available instances 224 in the instance pool 218. As instances are released by a customer when, for example, the instance is terminated, the instances may be returned to the available instances 224 in the instance pool 218. As described above, instances that are partially assigned may also be in the available instances 224.

The container management service 204 will select the instance 230 from the available instances 224 of the instance pool 218 based on the task definition 202 and/or from the paused task record 214, 216 maintained in task pool 212, as described herein. For example, the task definition 202 or task record may specify a set of parameters that define resources that may be used to instantiate a container on the instance and perform the task specified in the task definition (e.g., a number of CPUs, an amount of memory, an amount of network bandwidth, the presence of specialized hardware, etc.). Once the selected instances are identified, the container management service 204 may assign 232 the instances to the customer and, based on the task definition 202 to task record 214, 216, the task launcher component 210 may launch the task 228 (i.e., launch containers for the task) on the assigned instances 222, as described herein.

Figure 3:
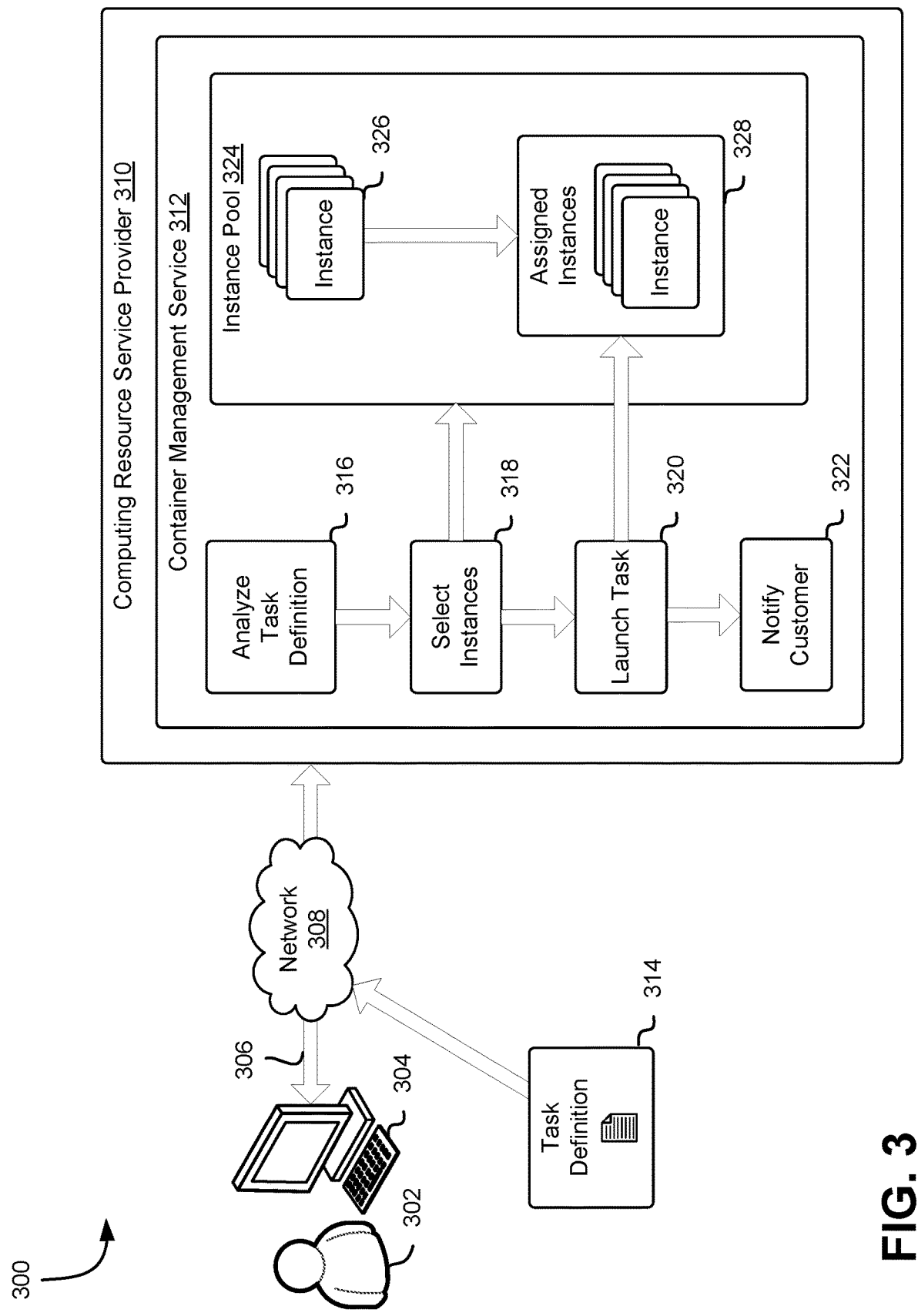
FIG. 3 illustrates an example environment where compute instances are instantiated and provisioned using a container management service to execute and manage tasks.

FIG. 3 illustrates an example environment 300 where compute instances are instantiated and provisioned responsive to tasks using a container management service, as described in connection with FIGS. 1 and 2, and in accordance with an embodiment. In the example environment 300 illustrated in FIG. 3, a user 302 may use a client computing device 304 to connect 306 to a variety of services provided by a computing resource service provider network 310. The computing resource service provider network 310 may be a cloud provider network, or "cloud," which refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load.

The user 302 may use the client computing device 304 to connect 306 to the computing resource service provider network 310 over a network 308 such as those networks described herein. The computing resource service provider network 310 may provide a distributed, virtualized, and/or datacenter environment within which one or more applications, processes, services, virtual machines, and/or other such computer system entities may be executed. The user 302 may be a person, or may be a process running on one or more remote computer systems, or may be some other computer system entity, user, or process. For example, the user 302 may be an autoscaling service that may pause, resume, or ask for additional tasks to meet demand for the tasks.

Commands from the user 302 to the computing resource service provider network 310 may originate from an outside computer system (such as from the electronic client device 902 of FIG. 9) or from within the computing resource service provider environment or network 310. The commands to connect 306 to the computing resource service provider network 310 may be sent to the computing resource service provider network 310 and/or the services operating in the environment therein, without the direct intervention of the user 302 (i.e., commands to connect 306 to the computing resource service provider network 310 may be generated automatically in response to one or more events). The user 302 may be a privileged user associated with a customer of the computing resource service provider network 310. The user 302 may also be a privileged user associated with the computing resource service provider network 310.

The computing resource service provider network 310 may provide access to one or more host machines, may provide access to one or more virtual machine instances as may be operating thereon, or may provide access to one or more services in an environment therein. The one or more services provided by the computing resource service provider network 310 may also be implemented as and/or may utilize one or more virtual machine instances as may be operating on host machines operating within the computing resource service provider network 310 environment. For example, the computing resource service provider network 310 may provide a variety of services to users including, but not limited to, the user 302 and the users may communicate with the computing resource service provider network 310 via an interface such as a web services interface or any other type of interface. While the example environment illustrated in FIG. 3 shows a single connection or interface to the computing resource service provider network 310, each of the services operating in an environment therein may have its own interface and, generally, subsets of the services may have corresponding interfaces in addition to or as an alternative to the single interface.

In an example of a type of service operating within the environment of the computing resource service provider network 310, a virtual computer system service may be a collection of computing resources configured to instantiate virtual machine instances on behalf of a customer such as the user 302. The customer may interact with a virtual computer system service (via appropriately configured and authenticated API requests) to provision and operate virtual machine instances that are instantiated on physical computing devices hosted and operated by the computing resource service provider network 310. The virtual computer system service may provision the instance by instantiating the instance, configuring the instance, and providing resources to run the instance. The virtual computer system service may also be configured to manage virtual machine instances to, for example, instantiate virtual machine instances and/or to manage the migration of virtual machine instances. The virtual machine instances may be used for various purposes, such as to operate as servers supporting a website, to operate business applications or, generally, to serve as computing power for the customer. Other applications for the virtual machine instances may be to support database applications, electronic commerce applications, business applications, and/or other applications.

As described above, a container management service 312 of a computing resource service provider network 310 may first receive a task definition 314 that, in the example illustrated in FIG. 3, is provided by the user 302 using the client computing device 304 used to connect 306 to the computing resource service provider network 310 over a network 308. It should be appreciated that a task definition or task record, may also be accessed from or through a stored paused task, such as maintained by a task pool. The container management service 312 may first analyze the task definition 316 as described herein and, as a result of that analysis, may select instances 318 to use to execute the task, based at least in part on the task definition 314. The instances that the container management service 312 selects may be instances that are in an instance pool 324. The instance pool 324 may contain a number of available instances 326 of a number of different instance types, as described above.

The selected instances may then be assigned to the task (also referred to herein as being assigned to the user 302) by the container management service 312. The container management service 312 may then use the assigned instances 328 to launch the tasks 320 (e.g., to instantiate the containers of the task definition 314 on the assigned instances 328). Finally, the container management service 312 may notify 322 the user 302 of the status of the task, including updating the user 302 as the status changes. In an embodiment, the notification includes access to the task and/or the containers using, for example, a uniform resource locator ("URI") and/or a web interface.

Figure 4:
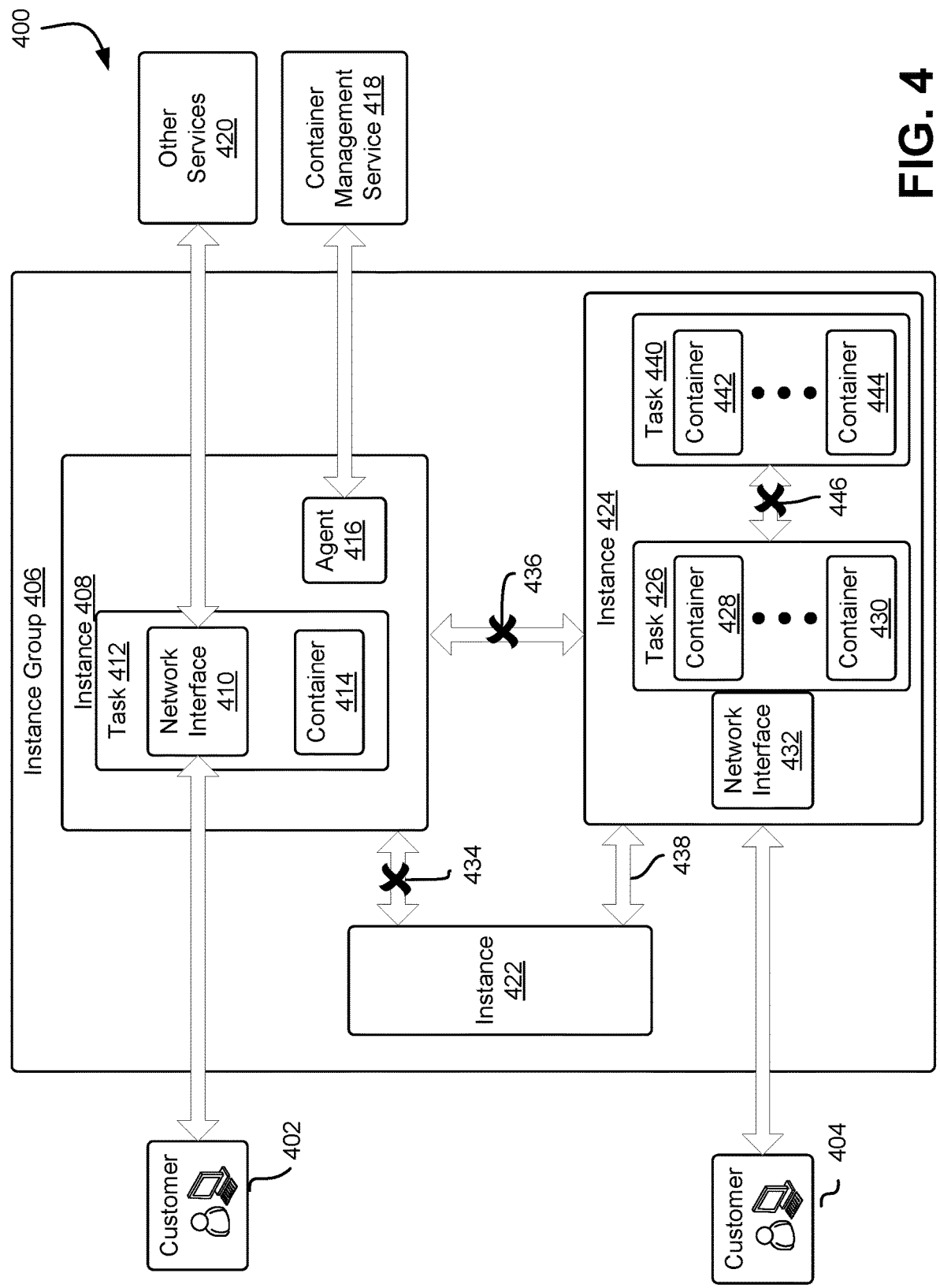
FIG. 4 illustrates an example environment where tasks are executed by compute instances that are isolated from each other.

FIG. 4 illustrates an example environment 400 where tasks, executing using container instances that are isolated from each other, may be managed, as described in connection with FIG. 1, and in accordance with an embodiment. In the example illustrated in FIG. 4, a customer 402 of a computing resource service provider has sent a task definition, as described above, and has been provided several instances that are running the task specified by the task definition. The three instances are in an instance group 406, which is a group or cluster of instances, providing isolation of the instances, as described above. An instance 408 of the instance group 406 has a network interface 410 associated with a task 412. The network interface 410 can be established when, for example the task is provisioned. The network interface 410 can be used by the customer 402 to communicate with the task (e.g., to monitor the status of the task and/or to receive results), to communicate between the task and one or more services of the computing resource service provider, or to connect the instance 408 to a virtual network of the customer. In an embodiment, the virtual network of the customer is a virtual private network, provided to the customer by the computing resource services provider and isolated from the virtual private networks of other customers of the computing resource services provider. The task 412 contains one or more containers 414, which were instantiated with the task 412 when the task 412 was started or resumed on the instance 408, as described above.

In the example illustrated in FIG. 4, the instance 408 has an agent 416 running thereon which, for example, reports the status of the task 412 to the container management service 418. A container management service 418 may also use the agent 416 to monitor the instance 408, to gather one or more health metrics for the instance (i.e., to determine potential hardware and/or software issues), to update the instance 408 or software running thereon, to communicate with the customer 402, or to perform and/or provide other services related to the functionality of the instance. In an embodiment, the agent 416 can monitor the instance and/or the tasks running thereon to determine costs associated with running the tasks. For example, an agent 416 can monitor the CPU and memory of the instance and determine, over the course of the task execution, which resources and what amount of those resources are used. For example, the agent 416 can monitor the CPU and memory to determine resource usage metrics for the task (e.g., what amount of memory and CPU is used by the task). These resource usage metrics can then be used to determine a resource cost associated with a container or with the task. This resource cost may then be apportioned to the customer based on actual resources used for the tasks. Thus, a task that requires more CPU time or more memory may cost less to execute than a task that requires less CPU time or less memory. In some aspects, the resource usage metrics and the resource cost may be used to determine when tasks of a customer are being under-utilized. In this scenario, if a task, or the resources used by a task, are underutilized, the agent 416 may use that information to inform an autoscaling service to pause the underutilized task, using the techniques described herein.

A customer may also specify pricing models in the task definition so that, for example, the customer can specify completion by a certain time, a "not to exceed" value, a priority for the task (e.g., lower priority tasks might be executed during off hours) and so on. For example, additional resources provided by a computing resource services provider environment may have a cost associated with the resource (e.g., a cost per second of CPU time, cost per megabyte ("MB") of memory used, or a cost to use networking bandwidth). The computing resource services provider can monitor such resource usage for a customer, and can also monitor resources provided to the customer to instantiate container instances to host containers by, for example, using an agent on the instance to monitor the resource usage. A customer can specify a pricing model in the task definition that specifies that any resources can be used to instantiate the containers, provided that such resources do not exceed a fixed cost, or a cost per hour, or according to some other cost specification. Similarly, the customer can specify that the task can be delayed to, for example, run within the next several days, to take advantage of lower resource costs that may exist during off-peak hours for the computing resource services provider. As described above, the task 412 may also specify a request for resources and/or provide resources to other services 420 operating within the computing resource service provider environment. For example, the task 412 may communicate with a database service, or a block storage service, or some other service via the network interface 410 and request resources from those other services 420. These other services 420 and/or the cost limits of these other services 420 may also be specified in the task definition for the task 412. In some cases, resource mapping of a task, such as stored in or associated with a snapshot of a paused task, may include one or more network connections to other services 420.

In the example illustrated in FIG. 4, the instances 408 and 422, and 404 and 424 in the instance group 406 are isolated from each other. Thus, the instance 408 has no communication 434 (indicated by the "x") with another instance 422 in the instance group 406 even though that instance 424 may also associated by the customer 402. Similarly, the instance 408 has no communication 436 with the instance 424 in the instance group 406. However, in some cases, one or more instances, such as instances 424 and 422, may interact with one another via communication link 438, such as configured or specified by customer 402 and/or customer 404. One or more of the instances, such as instance 408 may operate as if it is alone in the instance group 406, maintaining only the communication between the task and the other services 420, the communication between the agent 416 and the container management service 418, and the communication between the task 412 and the customer 402 using the network interface 410.

In some examples, any number of different tasks 426 and 440, each including a one or more containers 428, 430, 442, and 444, may run or reside on the same instance 424, but be isolated 446 from each other. In some aspects, multiple tasks may share a network interface 432, such that the network interface is associated with instance 424.

Figure 5:
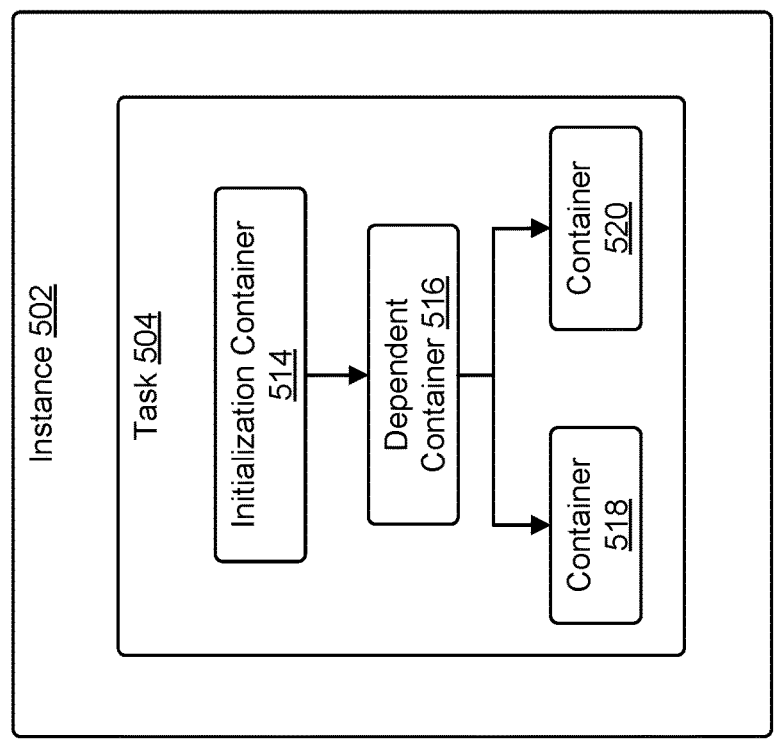
FIG. 5 illustrates an example environment where a task executing in multiple containers is instantiated using a container management service.

FIG. 5 illustrates an example of a computer instance where a task, including a number of dependent containers, may be executed, as described in connection with FIG. 1, and in accordance with an embodiment. As illustrated, a task 504 may be executed on an instance 502. The task 504 may be defined by a number of inter-related containers, such as an initialization container 514, and one or more dependent containers 516, 518, and 520. The dependency may include any of a number of organizational schemes, such as hierarchical and the like. In this example, execution or instantiation of dependent container 516 may rely or depend on execution or instantiation of the initialization container 514. In some aspects the dependence may be on one or more values generated by the initialization container 514, or the execution of instructions, such as included in the task definition, the result of which a dependent container 516, relies upon to execute its portion of task 504. Similarly one or more dependent containers 518, 520 may rely on another container, such as dependent container 516. In some aspects the dependent container may execute a process that relies at least in part on an output of a higher order container. In some cases, a process executing in container 514 may need to reach a certain stage in that process in order to trigger execution of a related or interconnected process by another container 516, and so on.

In some aspects, task 504 may be started and subsequently paused. In this scenario, the paused task may include a snapshot, which includes an image of one or more of containers 514, 516, 518, or 520. In some aspects, the snapshot may also include a mapping of the dependencies between the different containers 514, 516, 518, 520, and/or dependency between different applications running within these containers. In yet some examples, the snapshot may include an image of the initialization container 514 without the other containers 516, 518, 520, for example, in order to reduce the amount of memory needed to store the paused task. In some cases, when the task is paused during startup of the task, to for example, reserve capacity for a later time, only the initialization container 514 may be run before a snapshot is taken of the task 504. This may be done to reduce the amount of time and/or resources needed to initialize the task to a point where it is more efficient to take a snapshot for later resuming the task.

In some examples, the initialization container 514 may execute instructions that cause dependent container 516 to take over execution of the task 504, and/or send one or more values to containers 516, 518, or 520 to enable the processes carried out by those containers to begin, and upon executing those instructions, may end. In these and other examples, the task 504 may be paused upon completion of the process executed in initialization container 514 or immediately thereafter. In this way, some or all of the resource connections for task 504 may be captured in the snapshot. Upon resuming the task 504 with the snapshot, the resource connections may be more quickly established, and the task executed more efficiently.

Figure 6:
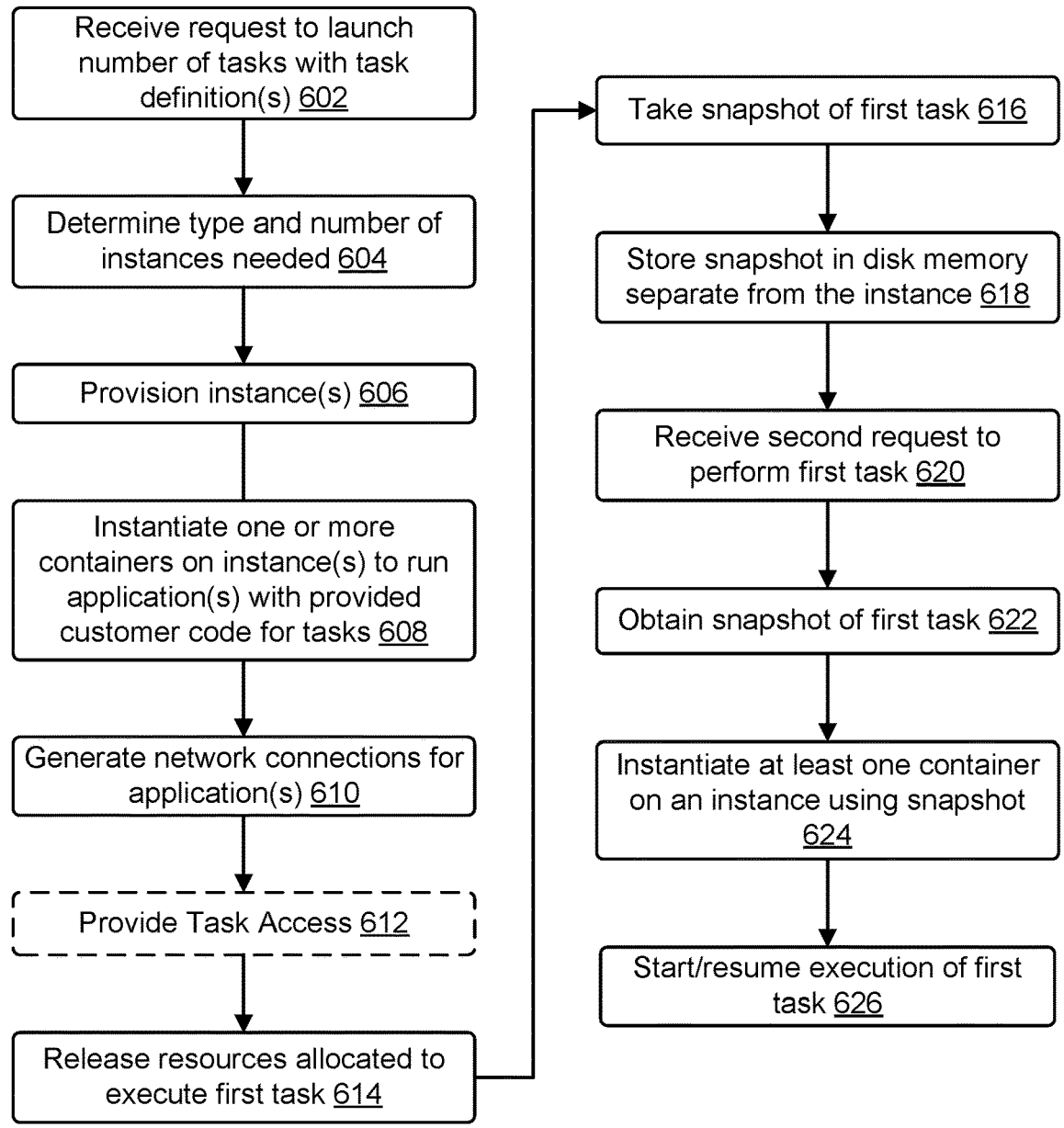
FIG. 6 illustrates an example process for starting, pausing, and resuming a task to conserver compute resources.

FIG. 6 illustrates an example process 600 for starting, pausing, and resuming a task, for example, to conserver compute resources. In some examples, process 600 may be performed by one or more of container management service 126, 204, 312 of FIGS. 1, 2, and 3, and/or by task manager 106, 206 of FIGS. 1 and 2. Dotted lines in FIG. 6 may indicate optional, but not required operations, such that process 600 may be performed without the optional operations.

Process 600 may begin at operation 602, in which a request to launch a number of tasks may be received, for example, by a container management service. The tasks may be defined by one or more task definitions, as described above, and may generally include one or more applications. In some aspects, the request may be received from a customer. In yet some aspects, the request may be received from an autoscaling service that based on need, historical usage data and the like, determines that more tasks will need to be provisioned to meet a predicted need.

At operation 604, a type and number of compute instances needed to launch the number of tasks may be determined, for example based on resource requirements indicated in the task definition(s). Next, at operation 606, the instance(s) may be provisioned to execute the number of tasks.

At operation 608, one or more containers may be instantiated on the instance(s) to execute the number of tasks. In some cases, operation 608 may include launching the one or more containers and executing at least some code provided with the request for the task or tasks. In other cases, operation 608 may include allocating resources to instantiate the one or more containers on the instance(s) without actually starting the execution of code or applications. In some examples, operation 608 may include launching and executing at some code in, or provisioning and not executing any code in an initialization container, upon which execution of other containers depend for the task or tasks. In some aspects, instantiating the one or more containers may also include generating or configuring network connections for the applications or tasks on the instance or instances, at operation 610.

In some examples, access to the task or tasks may be provided, such that the task is up and running, at operation 612. In other cases, the task may be provisioned but not actually running at this stage in process 600, such that access or interaction with the task (e.g., via interacting with a running application) would not be provided.

At operation 614, resources allocated to execute at least a first task of the number of tasks may be released, for example, in response to a request to pause execution of the first task. In other cases, operation 614 may be responsive to an autoscaling service instructing the container management service to pause a task based on a reduced need for the task. The resources may be released such that other containers of the instance or instances may be used to perform other operations, for example, for other containers, other customers, etc. In some aspects, pausing the first task may include also pausing the compute instance or instances upon which the one or more containers of the first task are instantiated. In this scenario, network connections, resource mapping, etc. of the one or more containers may be retained, such that on restarting the compute instance, the network connections may be readily utilized. This may be particularly useful when a task includes multiple containers.

At operation 616, a snapshot may be captured or obtained of the first task. The snapshot may include a container image of at least one container configured to execute the first task and current state information of the at least one container. As used herein, current state information may include an image or other collection of information indicating the state of the task at the time it was paused, such as network connections, resourcing mappings, and other information that may be relevant to executing the task. The snapshot may be stored in memory accessible by the container management service at operation 618 , such as on disk space, which is separate from the resources utilized by the compute instance to execute the first task or number of tasks. In some cases, the current state information of a task may indicate that performance by container is dependent on execution of an initialization container. In this scenario, the container image of the snapshot may additionally or alternatively include an image of the initialization container.

At operation 620, a second request to perform the first task may be received. The request may originate directly from a customer or from an autoscaling service based on an increase in demand for the first task. Responsive to receiving the second request to perform the first task, the snapshot of the first task may be obtained, at operation 622, and at least on container may be instantiated on an instance using the snapshot, at operation 624. The container may be configured with the current state information from the snapshot to perform the first task. The first task may then be resumed or unpause at operation 626. In this way, using the snapshot of the task, tasks may be more quickly and efficiently started or resumed by configuring resources to perform the task before the demand to perform the task is realized.

In some aspects, multiple snapshots of similar and/or different tasks, e.g., according to one or more task definitions, may be stored and managed in a task pool. A record or buffer may be maintained, which may indicate the number of tasks currently active and a number of paused tasks that are available for execution. In some cases, responsive to receiving a request to execute a task, the task record or buffer may be used to determine if there is at least one task of the inactive number of tasks in a paused state available. If there is a paused task that meets the request, a task from the task pool may be un-paused to fulfill the request. In some cases, an autoscaling service, for example, may obtain historical data of usage of a number of tasks, and based on that data, may instruct the container management service to provision a number of additional tasks and place them in a paused state to meet a predicted demand.

Figure 7:
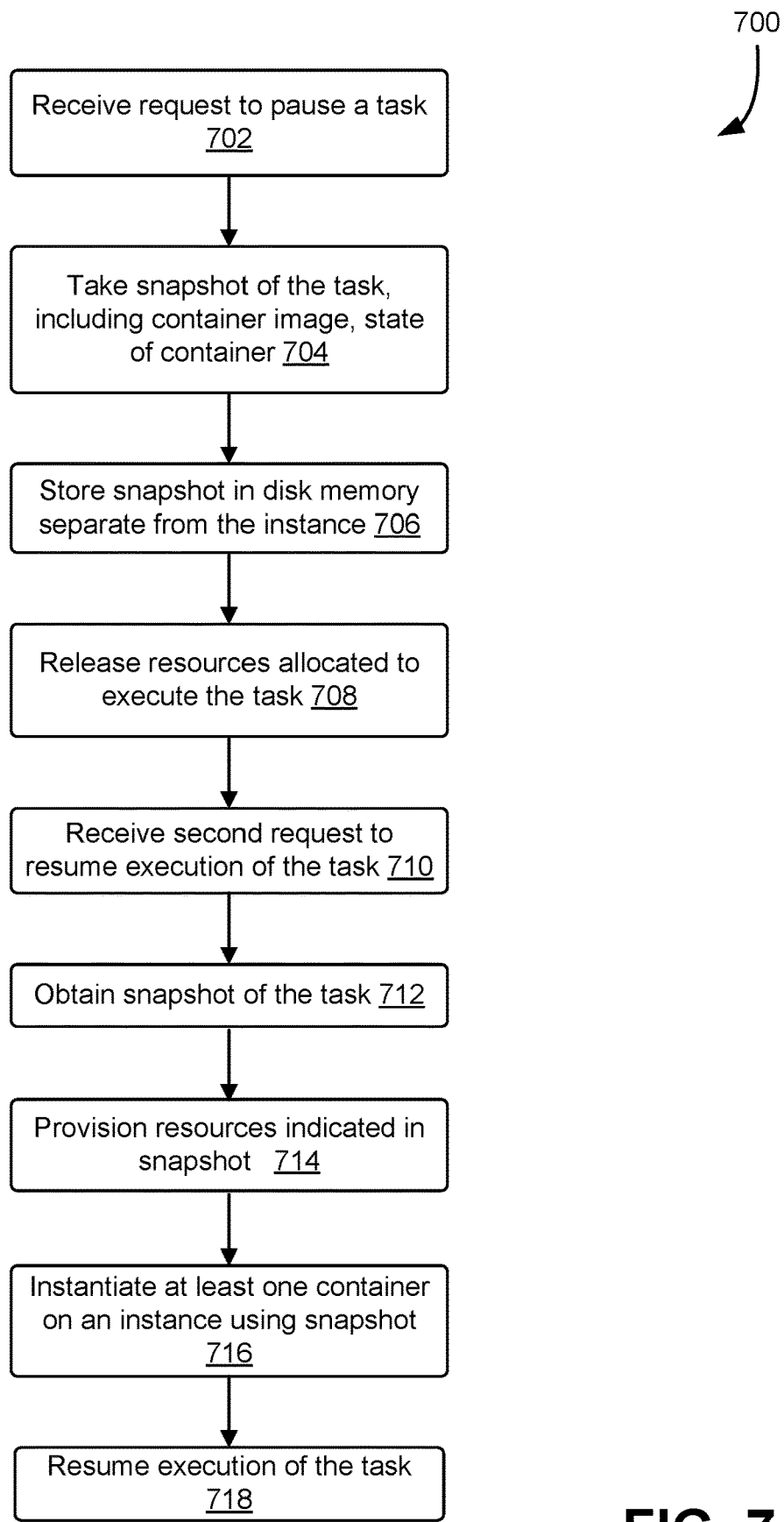
FIG. 7 illustrates an example process for pausing a running a task and resuming the task to conserver compute resources.

FIG. 7 illustrates an example process 700 for pausing a running a task and resuming the task, for example, to conserver compute resources. In some examples, process 700 may be performed by one or more of container management service 126, 204, 312 of FIGS. 1, 2, and 3, and/or by task manager 106, 206 of FIGS. 1 and 2.

Process 700 may begin at operation 702, in which a request to pause a task, executing executable instructions in at least one container running on a compute instance, may be received. In some aspects, the request to pause a task may be part of or received with a request to initialize and/or launch a number of tasks.

In response, the task may be paused, and a snapshot of the task may be obtained, at operation 704. The snapshot may include an image of the at least one container to execute the task and current state information of the at least one container. In some cases, the at least one container may be loaded with executable instructions, such as provided by a customer device, to execute the task. The current state information may include a resource mapping of resources used to execute the task. The snapshot may be stored in the memory, such as disk memory or other economical memory, separate from the compute instance, at operation 706. In some cases, the snapshot may be stored in task pool that includes a number of paused tasks. The snapshot may be utilizable to resume the task by a compute instance at a later time, on potentially other resources. At operation 708, the computing resources (e.g., CPU and RAM) allocated to executing the task may be released, such that the resources may be placed in a paused state, thus not consuming power, may be allocated to perform other tasks, etc.

A request to receive resume execution of the task may be received, at operation 710, such as from customer of from an autoscaling service. The snapshot may, in response, be obtained from disk memory, at operation 712, and resources may be provisioned according to the snapshot to resume execution of the task, at operation 714. In some cases, the snapshot of the task may be accessed from a task pool. At least one container may be instantiated on at least one compute instance to execute the task, according to the snapshot, at operation 716. The task may then be performed or resumed, at operation 718.

In some cases, responsive to un-pausing the task, at least one additional task may be provisioned, placed in a paused state, and added to the task pool, for example, to maintain a certain or minimum number of paused tasks for future changes in demand. In some aspects, a record of the number of paused tasks stored in the task pool may be maintained and updated when tasks are added or un-paused.

Figure 8:
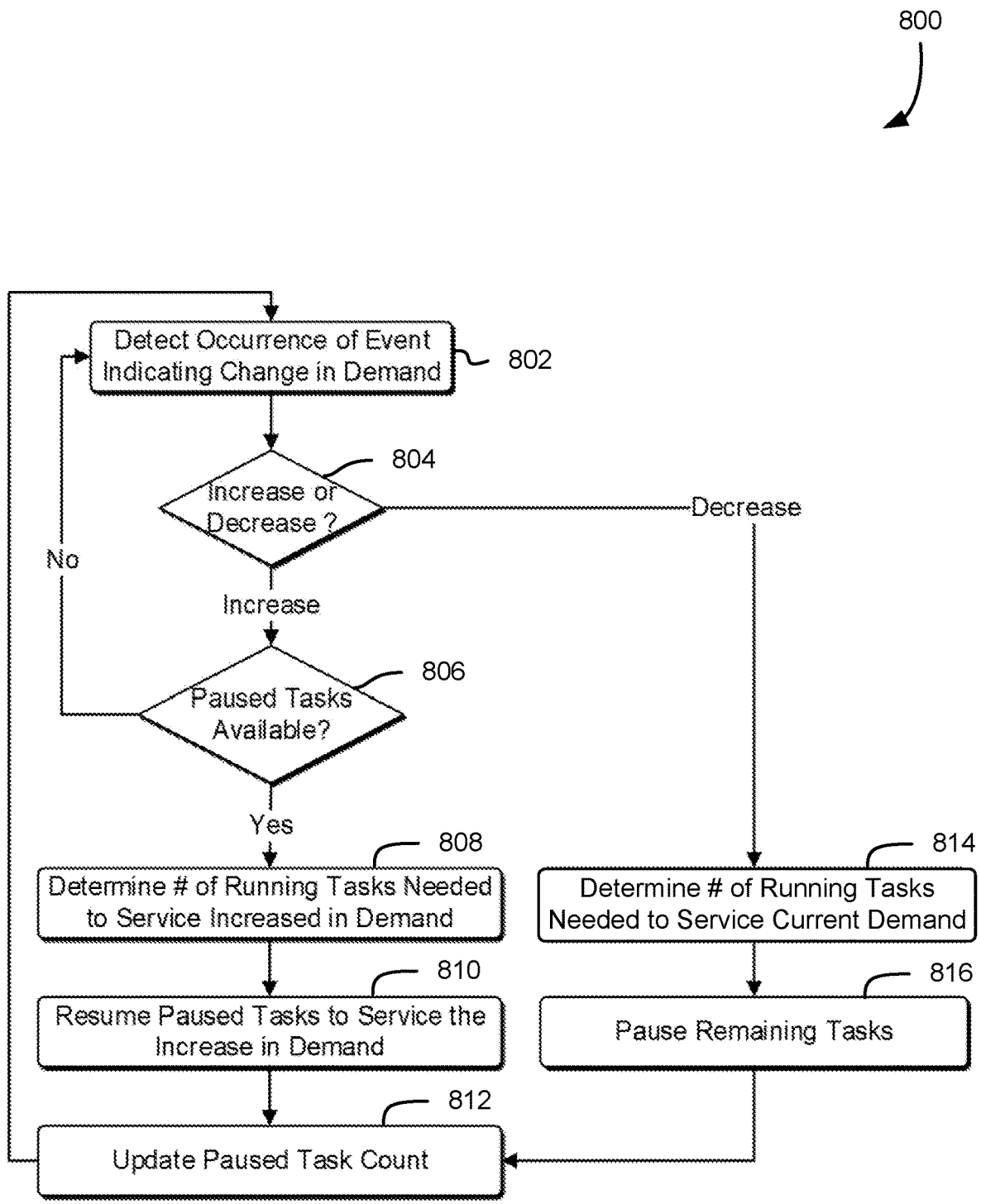
FIG. 8 illustrates an example process for managing tasks in a task pool responsive to a change in demand.

FIG. 8 illustrates an example process for managing tasks in a task pool responsive to a change in demand. In some examples, process 800 may be performed by one or more of container management service 126, 204, 312 of FIGS. 1, 2, and 3, and/or by task manager 106, 206 of FIGS. 1 and 2.

Process 800 may begin at operation 802, in which an indication of a change in demand for a set of running tasks may be detected or obtained. The indication may include a notification or instruction from an autoscaling service, a change in the number of tasks available in a task pool. The tasks may be defined by one or more task definitions, which may include software instructions for executing the set of running tasks.

At operation 804, it may be determined whether the change in demand is an increase or decrease in demand. If an increase is determined, at operation 806, it may be determined whether any paused tasks that satisfy the demand are available. This may include determining whether a set of paused tasks corresponding to the task definition is available from a pool of paused tasks. Individual paused tasks of the pool of paused tasks may include a snapshot, which contains at least an image of at least one container loaded with the software instructions to execute the paused task.

If no paused tasks are available, one or more new tasks may be provisioned to meet the increase in demand, and process 800 may return to operation 802 to monitor and subsequently detect a future change in demand. If there are available paused tasks, as determined at operation 806, process 800 may proceed to operation 808, in which a number of running task to service the increase in demand may be determined. In some aspects, operation 808 may include predicting a quantity of running tasks sufficient to manage the change in demand, and determining an amount of running tasks by which to adjust a size of the set of running tasks.

Upon determining that the amount is available, the size of the set of running tasks may be increased to the predicted quantity by un-pausing the one or more paused tasks to perform the software instructions on at least a second compute instance, at operation 810. Unpausing the paused tasks may include obtaining a snapshot of each task from a task pool, and loading the snapshots onto one or more second compute instances. In some aspects, the one or more second compute instances may be selected from a pool of running compute instances based on the task definition of the one or more tasks. In some cases, the snapshot of a task may include one or more network connections to the at least one container for performance of the task. In these cases, unpausing the task may include connecting the second compute instance according to the one or more network connections. A record of paused tasks may then be updated, at operation 812.

If, at operation 804, a decrease in demand is determined, process 800 may proceed to operation 814, in which a number of running tasks needed to service the current demand may be determined. Tasks that are not required to service the current demand may then be paused, at operation 816, such that a snapshot of each of those tasks may be obtained, and resources utilized to execute the tasks may be released. The snapshot may then be stored in the task pool, such that it may be restarted at a future time using the snapshot. A record of paused tasks may similarly be updated, at operation 812.

Figure 9:
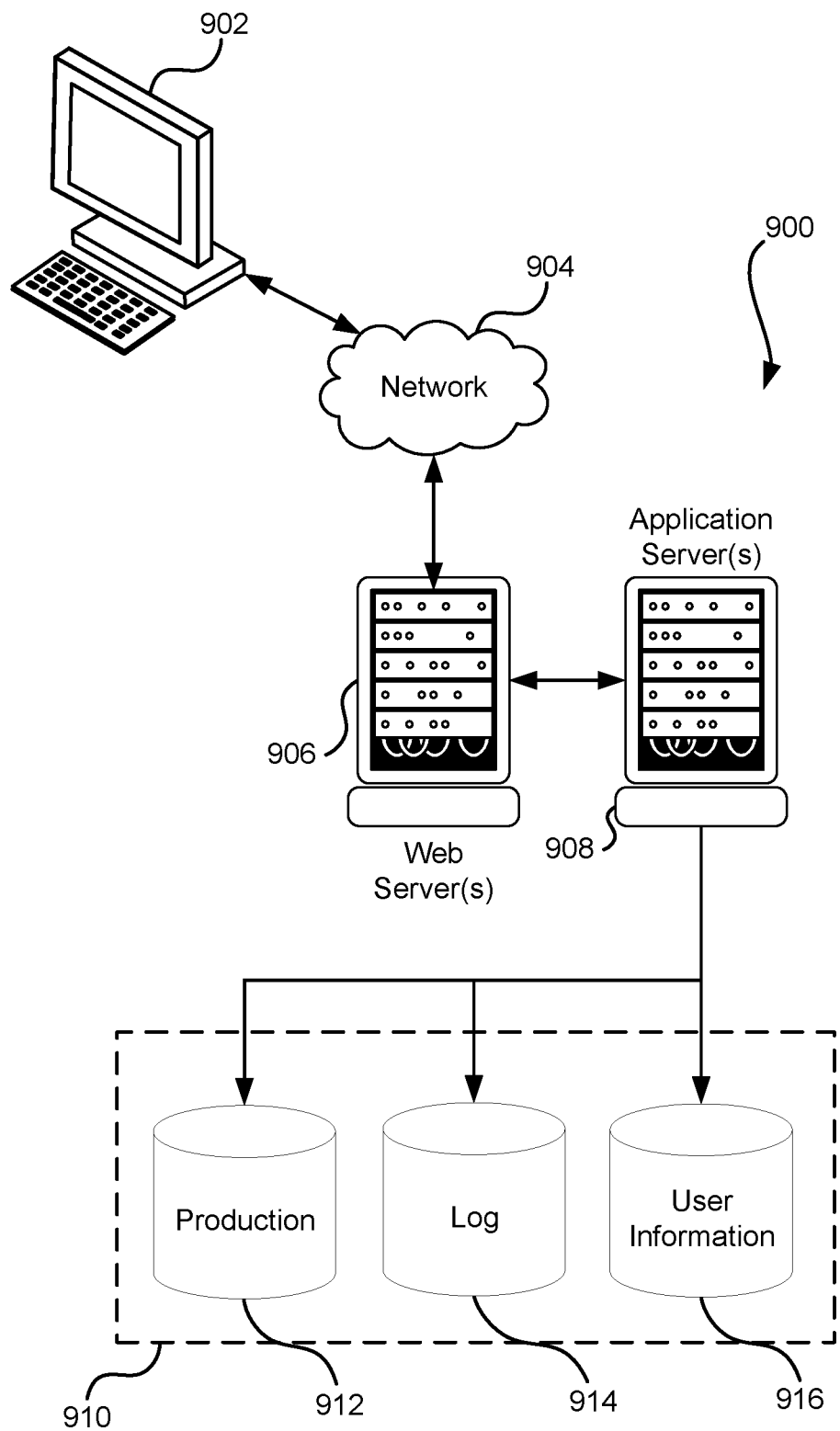
FIG. 9 illustrates an environment in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®,C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method comprising:
   receiving, at a container management service, a first request to perform a task, wherein the task represents a containerized workload;
   determining, by the container management service, to maintain an active instantiation of the task and a warmpool including a paused instantiation of the task;
   responsive to the first request, performing the task by launching and executing the active instantiation;
   creating the warmpool by at least:
      launching, by the container management service, one or more containers to execute another instantiation of the task;
      configuring resources required by the one or more containers;
      taking a snapshot of the one or more containers, wherein the snapshot comprises a container image of the one or more containers and current state information of the one or more containers having the resources configured;
      pausing the other instantiation of the task, whereby compute resources executing the other instantiation of the task are released; and
      storing the snapshot in a first memory accessible by the container management service to create the paused instantiation of the task; and
   responsive to receiving an additional second request to perform the task, performing the task by unpausing the paused instantiation of the task, wherein unpausing the paused instantiation of the task includes loading the snapshot onto a compute instance, instantiating a second one or more containers, and configuring the second one or more containers with the current state information.

2. The computer-implemented method of claim 1, wherein the container management service enables users of a cloud provider network to launch tasks by automatically provisioning underlying computing resources on behalf of the users.

3. The computer-implemented method of claim 1, further comprising:
    maintaining a record of a number of paused instantiations of the task responsive to receiving the additional second request, determining that there is at least one paused instantiation of the task of the number of paused instantiations of the task in the warmpool; and
    unpausing the paused instantiation of the task based on determining that there is at least one paused instantiation of the task of the number of paused instantiations of the task in the warmpool.

4. The computer-implemented method of claim 1, wherein:
    the current state information indicates performance by the one or more containers is dependent on execution of an initialization container; and
    the container image comprises an image of the initialization container.

5. A system, comprising:
    one or more processors; and
    memory that stores computer-executable instructions that are executable by the one or more processors to cause the system to:
    launch a plurality of tasks to obtain a plurality of launched tasks comprising first and second instantiations of a first task of the plurality of tasks;
    maintain the second instantiation of the first task as an active instantiation;
    update a plurality of snapshots by:
        creating a paused instantiation of the first task by pausing execution of the first instantiation of the first task, the first instantiation of the first task executing executable instructions in at least one container running on a compute instance;
        obtaining a snapshot corresponding to the paused instantiation of the first task, wherein the snapshot comprises an image of the at least one container loaded with the executable instructions and current state information of the at least one container;
        adding the snapshot to the plurality of snapshots, wherein an active compute instance is configurable to resume the paused instantiation of the first task using the snapshot; and
        releasing computing resources of the compute instance used to execute the first instantiation of the first task;
    receive a request to perform a second task;
    determine whether one or more snapshots of the plurality of snapshots correspond to a corresponding paused instantiation of the second task;
    resume the corresponding paused instantiation of the second task using at least one snapshot of the one or more snapshots when the one or more snapshots are determined to correspond to the corresponding paused instantiation of the second task, the at least one snapshot comprising state information, resuming the corresponding paused instantiation of the second task comprising loading the at least one snapshot onto a new compute instance, instantiating one or more containers, and configuring the one or more container with the state information; and
    launch a new instantiation of the second task when none of the plurality of snapshots is determined to correspond to the corresponding paused instantiation of the second task.

6. The system of claim 5, wherein the request is a first request and the computer-executable instructions when executed by the one or more processors, further cause the system to receive a second request to pause the first instantiation of the first task, the second request comprising a third request to initialize and launch a number of instantiations of the first task, where the number of instantiations of the first task comprises the second instantiation of the first task.

7. The system of claim 5, wherein the current state information of the at least one container further comprises a resource mapping of resources used to execute the first instantiation of the first task.

8. The system of claim 5, wherein
    the plurality of snapshots includes multiple snapshots corresponding to a number of paused instantiations of the first task, and the multiple snapshots are usable to resume the number of paused instantiations of the first task.

9. The system of claim 5, wherein the request is a first request and the computer-executable instructions when executed by the one or more processors, further cause the system to receive a second request to pause the first instantiation of the first task and create the paused instantiation in response to the second request.

10. The system of claim 5, wherein the computer-executable instructions when executed by the one or more processors, further cause the system to:
    store the plurality of snapshots in a task pool, the first and second tasks being a same task;
    provision at least one new paused instantiation of the first task; and
    add, to the task pool, at least one new snapshot of the at least one new paused instantiation of the first task responsive to the corresponding paused instantiation of the second task.

11. The system of claim 5, wherein the computer-executable instructions, when executed by the one or more processors, further cause the system to receive at least one request to launch the plurality of tasks and launch the plurality of tasks in response to receiving the at least one request.

12. The system of claim 5, wherein the computer-executable instructions when executed by the one or more processors, further cause the system to:
    store the plurality of snapshots in a task pool, the first and second tasks being a same task;
    maintain a record of a number of paused instantiations of the first task stored in the task pool; and
    update the record responsive to resuming the paused instantiation of the second task.

13. A non-transitory computer-readable storage medium storing thereon executable instructions that, as a result of being executed by one or more processors of a computer system, cause the computer system to at least:
    obtain an indication of a change in demand for a set of running instantiations of a task, wherein software instructions for executing the set of running instantiations of the task are indicated by a task definition;
    determine a predicted quantity of running instantiations of the task sufficient to manage the change in the demand;
    determine an amount of running instantiations of the task by which to adjust a size of the set of running instantiations of the task; and on a condition that the predicted quantity exceeds the size:
- determine whether a set of paused instantiations of the task corresponding to the task definition is available in the amount from a task pool of paused instantiations of the task, wherein individual paused instantiations of the task of the task pool comprise a snapshot, the snapshot comprising an image of at least one container loaded with the software instructions to execute the paused instantiations of the task; and
- upon determining that the amount is available, increase the size of the set of running instantiations of the task to the predicted quantity by un-pausing the set of paused instantiations of the task to perform the software instructions on at least a second compute instance.

14. The non-transitory computer-readable storage medium of claim 13, wherein the executable instructions further comprise instructions that, as a result of being executed by the one or more processors, cause the computer system to:
- on a condition that the predicted quantity does not meet the size of the set of running instantiations of the task, pause individual instantiations of the task of the amount of running instantiations of the task by:
  - obtaining the snapshot of the instantiation of the task, wherein the snapshot comprises an image of at least one second container loaded with the software instructions to execute the task; and
  - releasing compute resources of the at least one second compute instance, thereby, suspending performance of the instantiation of the task.

15. The non-transitory computer-readable storage medium of claim 13, wherein the indication of the change in the demand is obtained from an autoscaling service.

16. The non-transitory computer-readable storage medium of claim 13, wherein the instructions that cause the computer system to un-pause the set of paused instantiations of the task to perform the software instructions on at least the second compute instance further include instructions that cause the computer system to:
- obtain the snapshot from the task pool; and
- load the snapshot onto the second compute instance.

17. The non-transitory computer-readable storage medium of claim 13, wherein the task definition comprises a set of parameters for instantiating the at least one container, the set of parameters including a number of second processors and an amount of second memory for the at least one container.

18. The non-transitory computer-readable storage medium of claim 13, wherein the instructions further comprise instructions that, as a result of being executed by the one or more processors, cause the computer system to:
- select the second compute instance from a pool of running compute instances based on the task definition.

19. The non-transitory computer-readable storage medium of claim 13, wherein the snapshot further comprises one or more network connections to the at least one container for performance of the task, wherein the executable instructions that cause the computer system to increase the size by un-pausing the set of paused instantiations of the task to perform the software instructions on at least the second compute instance further comprises instructions that cause the computer system to at least:
- connect the second compute instance according to the one or more network connections.

20. The non-transitory computer-readable storage medium of claim 13, wherein the executable instructions that cause the computer system to determine whether the set of paused instantiations of the task corresponding to the task definition is available in the amount from the task pool of paused instantiations of the task, further comprises instructions that cause the computer system to at least:
- obtain a paused task count from a buffer that maintains a record of paused instantiations of the task in the task pool.

* * * * *